United States Patent
Crosby et al.

(10) Patent No.: US 10,558,494 B2
(45) Date of Patent: Feb. 11, 2020

(54) ENERGY-BASED SCHEDULING OF OPERATIONS TO BE EXECUTED BY A DATA PROCESSING APPARATUS

(71) Applicant: ARM IP LIMITED, Cambridge (GB)

(72) Inventors: James Crosby, Ely (GB); Hugo John Martin Vincent, Cambridge (GB); Jacopo Mondi, Cambridge (GB)

(73) Assignee: ARM IP Limited, Cambridge (GB)

( * ) Notice: Subject to any disclaimer, the term of this patent is extended or adjusted under 35 U.S.C. 154(b) by 146 days.

(21) Appl. No.: 15/309,724

(22) PCT Filed: Apr. 15, 2015

(86) PCT No.: PCT/GB2015/051140
§ 371 (c)(1),
(2) Date: Nov. 8, 2016

(87) PCT Pub. No.: WO2015/170073
PCT Pub. Date: Nov. 12, 2015

(65) Prior Publication Data
US 2017/0242727 A1  Aug. 24, 2017

(30) Foreign Application Priority Data

May 9, 2014 (GB) .................................. 1408201.0

(51) Int. Cl.
G06F 9/46 (2006.01)
G06F 9/48 (2006.01)
G06F 9/50 (2006.01)

(52) U.S. Cl.
CPC .......... *G06F 9/4893* (2013.01); *G06F 9/5094* (2013.01); *Y02D 10/22* (2018.01); *Y02D 10/24* (2018.01)

(58) Field of Classification Search
CPC ...... G06F 9/4893; G06F 9/5094; Y02D 10/22
See application file for complete search history.

(56) References Cited

U.S. PATENT DOCUMENTS 8,136,114 B1 * 3/2012 Gailloux ............ G06Q 10/0631
  705/7.12
9,837,817 B2 * 12/2017 Borean .................... H02J 3/00
2008/0313640 A1 12/2008 Liu et al.
(Continued)

FOREIGN PATENT DOCUMENTS

GB         2519080 A      4/2015

OTHER PUBLICATIONS

International Search Report for PCT/GB2015/051140, dated Jun. 25, 2015, 4 pages.
(Continued)

*Primary Examiner* — Camquy Truong
(74) *Attorney, Agent, or Firm* — Patterson Thuente Pedersen, P.A.

(57) ABSTRACT

A method of scheduling operations to be executed by a data processing apparatus 2 includes determining energy cost functions for candidate schedules of operations, based on which resources of the data processing apparatus are required for execution of the operations. One of the candidate schedules is selected based on the energy cost functions. By scheduling operations based on which resources are used by the operations, energy efficiency can be improved.

20 Claims, 4 Drawing Sheets

(56) References Cited

U.S. PATENT DOCUMENTS

| | | | |
|---|---|---|---|
| 2009/0037570 A1* | 2/2009 | Yu | G01D 21/00 709/224 |
| 2009/0183157 A1 | 7/2009 | Tran et al. | |
| 2011/0154348 A1* | 6/2011 | Elnozahy | G06F 1/324 718/104 |
| 2012/0036515 A1* | 2/2012 | Heim | G06F 9/5088 718/105 |
| 2012/0144394 A1 | 6/2012 | Prabhakar et al. | |
| 2012/0210325 A1 | 8/2012 | De Lind Van Wijngaarden et al. | |
| 2012/0290862 A1 | 11/2012 | Brown et al. | |
| 2013/0125130 A1 | 5/2013 | Stubbs et al. | |
| 2015/0058571 A1* | 2/2015 | Potter | G06F 9/30043 711/125 |
| 2016/0249354 A1 | 8/2016 | Crosby | |
| 2017/0034012 A1* | 2/2017 | Douglas | H04L 41/50 |

OTHER PUBLICATIONS

Written Opinion for PCT/GB2015/051140, dated Jun. 25, 2015, 8 pages.
Eunjeong Park et al: "Reconfigurable Service Composition and Categorization for Power-Aware Mobile Computing", IEEE Transactions on Parallel and Distributed Systems, IEEE Service Center, Los Alamitos, CA, US, vol. 19, No. 11, Nov. 1, 2008 (Nov. 1, 2008), pp. 1553-1564, XP011229319, ISSN: 1045-9219, DOI: 10.1109/TPDS.2008.107.
PCT International Preliminary Report on Patentability for PCT/GB2015/051140, dated Nov. 24, 2016, 10 pages.
GB Search Report for GB1408201.0, dated Nov. 19, 2014, 4 pages.

\* cited by examiner

ENERGY-BASED SCHEDULING OF OPERATIONS TO BE EXECUTED BY A DATA PROCESSING APPARATUS

RELATED APPLICATIONS

The present application is a National Phase entry of PCT Application No. PCT/GB2015/051140, filed Apr. 15, 2015, which claims priority from GB Patent Application No. 1408201.0, filed May 9, 2014, said applications being hereby incorporated by reference herein in their entirety.

BACKGROUND

The present technique relates to the field of data processing. More particularly, it relates to scheduling of operations to be executed by a data processing apparatus.

Energy efficiency is becoming increasingly important for data processing apparatuses, such as mobile devices powered by batteries or wearable devices such as watches or glasses. Also, devices with relatively small processing capability are increasingly being included in objects within buildings and the outdoor environment which are connected to the "cloud" or "Internet of Things". For example, sensors for sensing temperature or other conditions, health care monitoring devices for detecting health data for a user such as heart rate or blood pressure, or devices for controlling a lock on a door or a heating/air conditioning system, may be connected to the cloud so that data can be harvested and analyzed at a remote location, or a user can control their devices from a remote location. For such devices there may be relatively few tasks which the devices need to perform, and the device may not need to be active very often, and so energy efficiency may be a more important consideration than processing performance. Therefore, the present technique seeks to provide a more energy efficient approach for performing operations using a data processing apparatus.

SUMMARY

Viewed from one aspect, the present technique provides a method for scheduling operations to be executed by a data processing apparatus, the method comprising:
determining an energy cost function for a plurality of candidate schedules, each candidate schedule comprising a different selection or ordering of at least one operation available for execution by the data processing apparatus; and
selecting one of the plurality of candidate schedules for the data processing apparatus based on the energy cost functions of the plurality of candidate schedules;
wherein each candidate schedule has associated information identifying at least one resource of the data processing apparatus required for execution of the at least one operation for the candidate schedule; and
the energy cost function represents an energy cost of selecting the candidate schedule and is determined based on the associated information for the candidate schedule.

Hence, by considering which resources are required for executing the operations and scheduling the operations based on an expected energy cost of using these resources, the operations can be scheduled in a more energy efficient manner.

For example, activating or deactivating certain resources or continuing to use the resources over a period of time may incur a cost in terms of energy consumption and so it can be more energy efficient to schedule the operations with awareness of which resources are going to be used. This can allow grouping together of operations which use the same resources so that the resource does not need to be active for as long a time, or the number of times the resource is activated or deactivated can be reduced. In this way, more energy efficient system can be provided.

The selection based on the energy cost functions of the candidate schedules may be done in different ways. It may not always be best to select the candidate schedule with the lowest energy cost because sometimes selecting a candidate schedule with a higher energy cost may allow later schedules to be carried out more efficiently. However, considering future selections of candidate schedules may be more complex, so to provide a less processing-intensive scheduling operation, it may be simpler to select the candidate schedule having the energy cost function representing the lowest energy cost. Note that the energy cost function representing the lowest energy cost need not be the energy cost function with the lowest numeric value. It is possible for a higher valued energy cost function to indicate a lower energy cost than a lower valued energy cost function, or vice versa.

In some cases, the scheduling may set an energy cost limit which limits which candidate schedules are allowed to be selected for processing by the processing apparatus. For example, there may be a maximum amount of energy or power which can be drawn from a battery or other power source for the data processing apparatus, or for energy efficiency arbitrary limits may be set. Hence, candidate schedules having a greater energy cost than the limit may not be selected. Candidate schedules whose expected cost is over the limit may be delayed until their expected energy cost becomes lower. In this way, energy efficiency can be improved.

The energy cost function may also be based on a current use state of resources of the data processing apparatus following execution of previous operations. For example, the current use state may reflect which resources are already active following the previous operations, a current operating mode or state of the resources, or an extent to which the resources are being used or the amount by which resources have been consumed. For example, it may be more efficient to select a candidate schedule which uses an already activated resource or which requires the resource to be in the state in which it is currently operating, rather than schedules whose operations need resources to be activated or to change state.

The energy cost function may depend on a degree of similarity or correlation between the current use state of the resources and the resources identified by the associated information for the candidate schedule. This correlation may be determined in various ways, but may be a complex problem if there are many resources to consider. An efficient way of determining the correlation may be to represent the current use state of the resources using a prefix tree (also known as a trie) and to search the prefix tree for a value representing the resource(s) required to carry out the operations of the candidate schedule. For example, the prefix tree may have nodes representing each resource, and the branches between nodes may reflect dependencies between resources. For example, if one resource (e.g. a voltage regulator) requires another resource to be active in order to function properly (e.g. a battery must to be active to power the voltage regulator), then the dependent resource can be represented by a child node branching from a node corresponding to the parent resource. If a resource has several different states or modes then further nodes may be provided for each state/mode, branching from the node corresponding to the resource itself. The search of the prefix tree may return a common prefix representing a subset of common resources which are currently active and are also required by the candidate schedule. The common prefix may then be used as a factor for determining the energy cost function. This provides a more efficient algorithm for determining the energy cost function based on the current usage of resources.

In some cases the energy cost function may represent a total amount of energy consumed if the candidate schedule is selected for execution. On the other hand, other energy cost functions may represent the power (energy per unit time) drawn if the candidate schedule is selected. In some cases, the total amount of energy used when performing operations may not be as important as the power drawn (for example, it may be important to limit any spikes in power). Therefore, in this application any references to energy, energy consumption or energy cost should also be interpreted to include power, power consumption or power cost. For example, the energy cost function may represent an instantaneous power drawn if the candidate schedule is selected (where instantaneous means the power drawn over a relatively short period of time). The energy cost function may represent a predicted power expected to be consumed if the candidate schedule is selected, or be based on previous measurements of the power consumed if the candidate schedule is selected.

The energy cost functions may consider different factors. In some examples, each resource may be associated with a given resource use cost and the energy cost function may depend on the resource use costs of resources required for the at least one operation for the candidate schedule. The resource use cost may represent costs of activating the resource and/or deactivating the resource. The activation and deactivation costs may be specified independently. In some cases the energy cost function may correspond to the activation costs of resources required by the operations which have not already been activated and the deactivation cost of deactivating already active resources which are not required by the schedule. The deactivation cost may for example factor in the cost of later activating the resource again if another operation needs the resource. Activation and deactivation of the resources may in some cases correspond to switching on and off a device respectively, or switching devices to a higher power mode and lower power mode respectively. In other cases the resources may be temporarily available data, in which case the activation and deactivation costs may correspond to the cost of generating and deleting the data respectively. Alternatively, the resource use costs may correspond to the expected energy cost of continued use of the resource over a period of time. For example, for some resources the cost of activating/deactivating the resource may be relatively insignificant, but there may be a cost associated with ongoing use of the resource, which may be reflected in the resource use cost.

In some cases the resource use cost may vary depending on the current use state of the corresponding resource. There are some resources which may be inefficient to use when few operations or devices use the resource but become more efficient as the utilisation of the resource increases. In this case, it may be desirable to make the resource use cost high when the resource use is low but make the cost lower when the resource use is higher. Similarly, resource use cost may depend on a current operating mode or state of the resource.

The resource use cost may in some cases correspond to an approximate estimate of the energy consumed when using the resource. However, it is also possible to make an actual measurement or estimation of energy consumed while the resource is being used and to establish the resource use costs based on the measured energy consumption. In some cases, there may not be individual measurements of energy consumed for each resource and instead these may be inferred from a measurement of the overall energy consumed by the apparatus as a whole or a portion of the apparatus over a period of time. For example, information representing which resources were used when may be maintained (e.g. a log of activation/deactivation times for the resources), and this can be used to allocate fractions of the measured energy consumption to each resource. Hence, even if the measurement of the total energy consumed is precise, the resource use cost inferred for each resource from this measurement may still be an approximate estimate.

In some cases the energy cost function may depend on environmental conditions detected by the data processing apparatus or known to the data processing apparatus from another device. For example, the energy efficiency of some resources may vary with temperature conditions, or with the data processing apparatus's location, or its relative position in a network.

In some cases the energy cost function may reflect a probability that subsequent operations will require a similar use state of resources to the at least one operation for the candidate schedule. For example, some candidate schedules may include operations or have associated information which provide a hint that a future schedule will need similar resources. For example, if one candidate schedule includes an operation for sending a transaction to a peripheral device which requires a response, it may be likely that a subsequent schedule will need to process the response from the peripheral device, hinting that the peripheral device may continue to be used beyond the current schedule. This may make the expected energy cost of the peripheral device lower than if only the current schedule was expected to use the device.

In some cases the energy cost functions may represent an approximate estimate of the energy cost of a candidate schedule. For example, rather than using floating point arithmetic, integer arithmetic may be enough to generate an approximate energy cost function, to make the processing more efficient. Even if the energy costs are only approximate the scheduling based on the energy costs can still improve the overall energy efficiency of the processor.

In some cases the energy cost function for a candidate schedule as a whole may be based on a measured energy cost measured when at least one operation of the schedule was previously executed. Hence, as well as measuring or estimating energy costs of individual resources it is possible to measure energy consumption when a set of operations is executed, and use this to determine the energy cost function when those operations are encountered again.

Having selected the candidate schedule, the method may comprise activating or initializing at least one resource required for execution of the at least one operation for the selected schedule, and/or deactivating or de-initializing at least one resource not required for execution of the at least one operation.

Energy cost functions may be cached and accessed later when the candidate schedule is encountered again. Determining the energy cost function may be relatively expensive in terms of processing resource, and some sets of operations may be executed several times. For example, function calls may be called several times, or operations may be repeated as part of a program loop or following a branch. By caching energy cost functions, the processing used to determine the cost functions does not need to be repeated and so energy can be saved.

Similarly, data may be cached indicating which candidate schedules were selected when a certain set of conditions occurred, and if these conditions occur again then the cached candidate schedule may be selected so that it is not necessary to determine the energy cost functions for multiple candidates at this point. For example, a schedule may be associated with a particular program counter value, operating mode of the device, or function call, or a combination of these conditions, and when the conditions occur again then the schedule may be selected for execution without repeating the energy determination.

In general, each candidate schedule corresponds to at least one operation to be performed by the data processing apparatus. In some examples, it may be convenient to partition a program to be executed into groups or blocks of program instructions or sections of code, and each candidate schedule may comprise the operations executed by the data processing apparatus in response to at least one block, group or section. Note that the operations within a candidate schedule may include operations which are not directly caused by the corresponding block of instructions.

In some examples, the associated information may correspond to a candidate schedule as a whole, with the associated information indicating the resources required by all the operations for the schedule. In other cases, groups or blocks of operations within the schedule may each have associated information specified for that group or block, or individual operations may have the associated information identifying the required resources. In this case, the candidate schedule may have several pieces of associated information for different operations within the schedule. The scheduling method may then use the associated information for each set of operations within the candidate schedule to determine an overall cost function for the schedule.

In some examples, each candidate schedule may simply comprise a single group of operations, block of instructions, or section of code having a single piece of associated information. In this case, the selection of a candidate schedule to execute may simply correspond to selecting the group or operations which has the lowest expected energy cost for executing next by the processor. Other more complex scheduling embodiments may provide candidate schedules including more than one group of one or more operations, with different candidate schedules having different orderings of the groups within the candidate schedule. Sometimes, handling the same groups of operations in a different order may change the energy efficiency.

In some cases the associated information for candidate schedules or for sets of operations within the schedule may be provided by a programmer of a program to be executed by the processing apparatus. For example, the programmer may annotate their program with an indication of which resources are required at different points. In other cases, the associated information may be determined by a compiler when compiling the program, based on the instructions which the programmer selected. Also, the associated information may be determined dynamically at execution time by the data processing apparatus. For example, the associated information may be based on which resources were used for operations on a previous instance of execution.

The associated information may identify a time window within which the at least one operation of a candidate schedule should be executed by the data processing apparatus. Again, this time window information may be specified at the granularity of the candidate schedule as a whole or for individual sets of one or more operations with the schedule. Specifying a window within which operations can be executed (rather than specifying an absolute time at which the operation should be executed) allows operations to be deferred if possible, which gives more freedom for reordering operations based on the energy cost functions.

The time window information may be used to select which schedules to use as candidate schedules for the energy cost determination. For example, a number of schedules may be available for execution, and of these schedules a certain number (N) of schedules may be selected for which the time window will expire the earliest. The scheduler may then determine M of these N candidate schedules which have a time window which will already have started at the current execution time. These M candidate schedules may then be used as candidate schedules for the energy cost determination. This approach provides a relatively simple mechanism for obtaining candidate schedules to ensure that they are executed within their required time window while also enabling an energy efficient scheduling method. In general, schedules whose time windows expire soonest have a better chance of being selected because they will be in the first N candidate schedules sorted by the expiry time of the time window, but then within those schedules it is possible to choose schedules based on their expected energy cost.

It is possible for the energy cost function to also consider factors which do not directly affect the energy consumption of the apparatus. For example, as well as the resource use costs or the comparison with the current use state of the resources, it is also possible to factor in an "urgency" factor which reflects how soon the time window for the candidate schedule will expire, to reduce the likelihood that some candidate schedules are executed after their time window has ended, or to prioritise schedules based on another parameter. In some cases a different prioritisation scheme may be used first to determine the candidate schedules for execution, and then the energy cost function may be used to determine which of several candidate schedules having the same priority should be executed.

In some cases the scheduling method may be performed by the data processing apparatus itself at execution time. Hence, as the apparatus executes a program it may have a scheduling task or a hardware scheduler which forms candidate schedules using operations for the program, and selects schedules for execution based on the energy cost functions as discussed above. However, it is also possible to perform the scheduling ahead of time. For example, the scheduling can be done at compile time, or as a preliminary step performed by the processor just before executing the program. Also, if a program is executed several times then schedules determined on a previous instance of execution may be used again later on. Hence, when selecting a candidate schedule to be executed at a current execution time, the current execution time refers to the time at which the candidate schedule will be executed (which may be at some point in the future), not necessarily the time at which the scheduling is performed. It is also possible to perform part of the scheduling ahead of time, and the remainder at runtime.

As well as allowing more energy efficient scheduling of operations, the energy cost functions also can be used to provide diagnostic information about the energy efficiency of a task executed by the data processing apparatus. Having selected candidate schedules for execution by the data processing apparatus while performing the task, diagnostic information may be generated based on the energy cost functions of the schedules which were selected. For example, a graph of energy efficiency could be obtained or an energy efficiency score could be output. This can be useful for developers to improve the energy efficiency of their code. The diagnostic information may also be used to select between different tasks which are available for execution by the data processing apparatus. For example, a device may be able to be controlled by several parties. Some parties controlling the device may provide tasks which are less energy efficient than others. To improve battery lifetime the system may choose to exclude users who were previously found to control the device in an energy inefficient manner.

The resources required by the operations may include anything required in order to carry out processing operations. For example, the at least one resource may comprise any combination of one or more of:

(i) at least one hardware device of the data processing apparatus (e.g. a peripheral device, memory, radio transmitter, etc.);
(ii) at least one energy or power source of the data processing apparatus (e.g. a battery or voltage regulator);
(iii) at least one bus for transmitting data within the data processing apparatus;
(iv) a selected configuration of a reconfigurable device of the data processing apparatus (e.g. a particular configuration of an FPGA (field programmable gate array), for which the energy cost may reflect the fact that once the FPGA has already been configured in a particular configuration, operations using the same configuration may be more efficient to run than operations requiring a different configuration);
(v) access to shared data or content stored by the data processing apparatus (e.g. a locked variable in memory, for which the energy cost when already locked is higher than if not locked);
(vi) access to temporarily generated data which if not already available would need to be regenerated by the data processing apparatus (e.g. compressed data which if already available in a decompressed form has a lower energy cost than if the data has to be decompressed before use); and
(vii) consumable resources used by the data processing apparatus (e.g. a capacitor which when in an already charged state may have a lower energy cost than when in a discharged state which requires charging before further use).

The scheduling method may be used in both uniprocessor systems and multiprocessor systems. In a multiprocessor environment, the method may be applied to just one of the processors or to several or all of the multiple processors. In a multiprocessor system the resources considered for the energy cost functions may include shared resources which can only be accessed by one of the processors at a time. For example, if a shared data structure requires locking to prevent use by the other processor, then the energy cost functions may consider whether the required resources are already locked or are available for use. Also, the resources may include the state of a hardware transaction memory shared by the processors.

In a similar way, shared or lockable resources may be considered in apparatuses which execute multiple threads of execution within the same processor, where a resource is shared between threads.

The method may be implemented using a computer program for controlling a data processing apparatus to perform the method described above. The program may be stored on computer readable storage medium, which may be a non-transitory medium.

Viewed from another aspect, the present technique provides a data processing apparatus comprising:

processing circuitry configured to execute operations; and a scheduler configured to schedule operations to be executed by the processing circuitry;

wherein the scheduler is configured to determine an energy cost function for a plurality of candidate schedules, each candidate schedule comprising a different selection or ordering of at least one operation available for execution by the processing circuitry, and select one of the plurality of candidate schedules for the processing circuitry based on the energy cost functions of the plurality of candidate schedules;

wherein each candidate schedule has associated information identifying at least one resource of the data processing apparatus required for execution of the candidate schedule; and the energy cost function represents an energy cost of selecting the candidate schedule and is determined based on the associated information for the candidate schedule.

Viewed from a further aspect, the present technique provides a data processing apparatus comprising:

processing means for executing operations; and scheduling means for scheduling operations to be executed by the processing means;

wherein the scheduling means is configured to determine an energy cost function for a plurality of candidate schedules, each candidate schedule comprising a different selection or ordering of at least one operation available for execution by the processing means, and select one of the plurality of candidate schedules for the processing means based on the energy cost functions of the plurality of candidate schedules;

wherein each candidate schedule has associated information identifying at least one resource of the data processing apparatus required for execution of the candidate schedule; and the energy cost function represents an energy cost of selecting the candidate schedule and is determined based on the associated information for the candidate schedule.

DESCRIPTION OF DRAWINGS

Further aspects and features of the present technique will be apparent from the following description of examples, which is to be read in conjunction with the accompanying drawings, in which.

DETAILED DESCRIPTION

Figure 1:
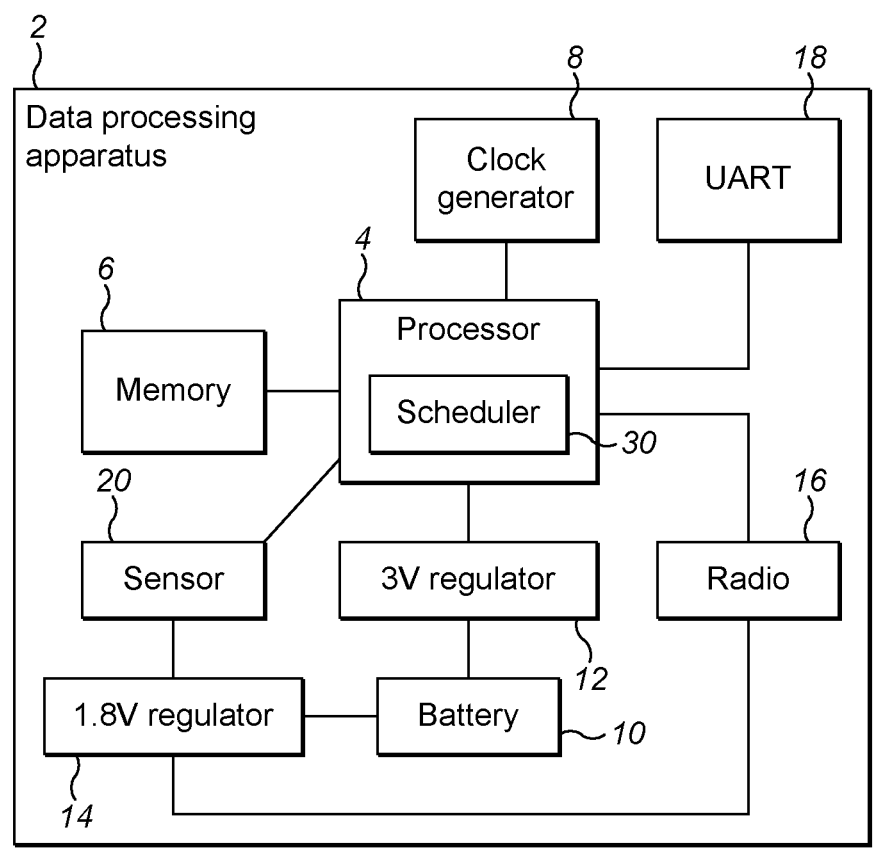
FIG. 1 schematically illustrates an example of a data processing apparatus.

FIG. 1 schematically illustrates a data processing apparatus 2 having a processor 4 and various resources available for use when processing operations. For example, the resources may include data within a memory 6 (which may include one or more caches), a clock generator 8, a battery 10, voltage regulators 12,14 for generating different voltage levels (e.g. 3V and 1.8V respectively in this example), a radio unit 16 for communicating with other devices using radio signals, a universal asynchronous receiver/transmitter (UART) 18 for communicating with a peripheral device, and a sensor 20 for sensing external conditions of the apparatus 2, such as temperature. It will be appreciated that FIG. 1 merely shows an example of devices that could be included. In general, a data processing apparatus may have many different types of resources, including hardware units such as peripherals, oscillators, clocks, regulators, chips, configurations of processing chips or FPGAs, single use hardware units or rechargeable units such as a supercapacitor, energy or power sources and buses or bus configurations.

The resources may also include less tangible resources such as logical resources corresponding to data structures or program state. For example, a resource may include a particular virtual machine needed to perform processing operations, or a shared data structure which needs to be locked for use by the processor before operations can be performed. The resources may also include temporary or ephemeral content in the memory 6, such as graphics data which needs to be decompressed before being used by the processor 4. In its stored compressed state the graphics may be considered unavailable or inactive but when decompressed and cached in decompressed form then it may be considered available for processing. The resources may also include regenerable or cacheable data such as graphic layers. The resources may also include remote resources which can be accessed by the data processing apparatus 2 via a network or communication unit. Therefore, the resources are not limited to local resources.

Therefore, there are a number of resources which may be required for different operations in the processor 4. Each resource may have a certain energy cost associated with maintaining it in an active state. For example, powering up the radio units 16, sensor 20 or voltage regulators 12, 14 for a period may be expensive, and so it is generally desirable to use these devices for as short a time as possible. Similarly, there may be an energy cost associated with activating resources, such as switching on a hardware unit or generating the temporary data required for an operation. Once activated, it is more efficient to schedule several operations requiring the same resource than to perform one operation using the activated resource, deactivate the resource and then activate it again when another operation is required. Therefore, the way in which operations are scheduled for processing affects the energy consumption of the device.

In general, the processor 4 may need to execute a given set of operations in response to a program code. Different sets of operations to be executed by the processor may be grouped together and each group may be associated with information defining which resources are required for execution of these operations. One or more groups of operations may be considered to form "candidate schedules" which are available for selection for processing by the processor 4. Each candidate schedule may correspond to a different selection or ordering of one or more operations to be performed by the processor 4. A scheduler 30 executing on the processor 4 (or a separate scheduling unit) may determine several candidate schedules from which one schedule can then be selected to be executed by the processor 4. This can be done at execution time while executing a programme, where the scheduler 30 may select a candidate schedule to be executed next by the processor 4, control the processor 4 to start executing that schedule, and then consider which schedule to execute after that. In other systems the scheduling may take place in advance, for example at compile time or at a previous execution of the program, and so at execution time the processor 4 may simply read data defining which schedules of operations to execute.

Figure 2:
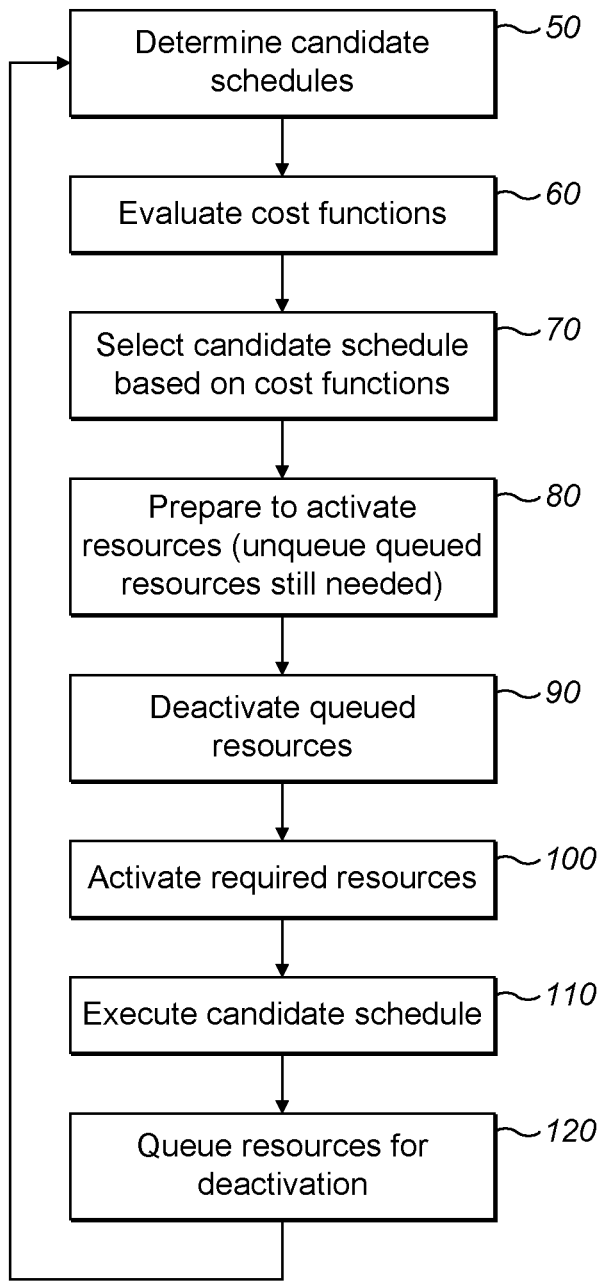
FIG. 2 illustrates a method of scheduling operations for the processing apparatus using energy cost functions.

FIG. 2 shows a method of scheduling operations for the processor. At step 50, a number of candidate schedules are determined, each including at least one operation to be performed. The different candidates may include different operations, or some candidates may have the same operations but in a different order. Each candidate schedule has some associated information defining which resources are required for carrying out that schedule. The associated information may be set for the schedule as a whole or for individual parts of the schedule, such as different groups or blocks of operations within the schedule.

At step 60 the scheduler 30 evaluates energy cost functions for each candidate schedule based on the associated information for the candidate schedule. The energy cost functions represent an expected energy or power which will be consumed when performing the candidate schedule. The energy cost function may consider the cost of activating resources required for the candidate schedules, given knowledge of the current use state of resources. The energy cost function may not need to be determined for all the candidate schedules. For example, cost functions may be cached in the memory system 6 and so if a cost function for a given schedule is already cached then its calculation does not need to be repeated. In some cases the cost functions may be representative of the total energy consumed when processing a candidate schedule, or alternatively may represent a maximum power drawn when performing the operations of the schedule.

Having obtained energy cost functions of each candidate schedule, at step 70 a candidate schedule is selected based on the cost functions. For example, the candidate schedule with the energy cost function representing the lowest expected energy cost may be selected, or a more complex approach may be used. At step 80, the apparatus prepares to activate resources which are required by the selected schedule. The apparatus may have a queue of resources to be deactivated. In the preparing to activate step 80, any resources in the deactivation queue which are still required by the candidate schedule selected at step 70 may be unqueued so they will no longer by activated. At step 90 the remaining queued resource are deactivated. For example, this may include powering down hardware units, deleting or resetting data structures, making data structures available for deletion or resetting (e.g. cached data may be flagged for deletion but may not actually be deleted until it is overwritten when the cache line is needed for storing other data) or changing the mode of operation of a hardware unit.

At step 100 any resources not already active which are required for the selected candidate schedule are activated. For example, this may include powering up a hardware unit, creating a required data structure, or locking a resource required by the operations. At step 110 the processing circuitry 4 executes operations of the selected candidate schedule using the required resources. At step 120, some resources used by the processor when carrying out the selected schedule may be queued for deactivation. Not all of the resources used are necessarily queued for deactivation immediately. An operation may have started an asynchronous task (e.g. a DMA transfer copying data from memory to the UART) that continues to need some resources after the operation itself has completed. The method then returns to step 50 to select the next schedule to be executed.

By queuing resources for deactivation following execution of a resource, but unqueuing them if they are still required for the next selected schedule, this helps to reduce the number of times resources are activated and deactivated. A record of which resources are active may also be maintained.

Note that the resources queued for deactivation at step 120 need not necessarily be the resources which have been used by the schedule which has just been executed by the processor 4. Some operations may trigger use of a resource for some time after execution of the operation, so that that resource is only deactivated later on when the processor is already doing something else. For example, one schedule may instruct an operation to be performed using a peripheral device, and then some time later a response may be received from the peripheral over a bus. Hence, the bus may only be able to be deactivated later, and so even if a later schedule does not require the bus, following execution of that schedule the bus may need to be queued for deactivation.

Figure 3:
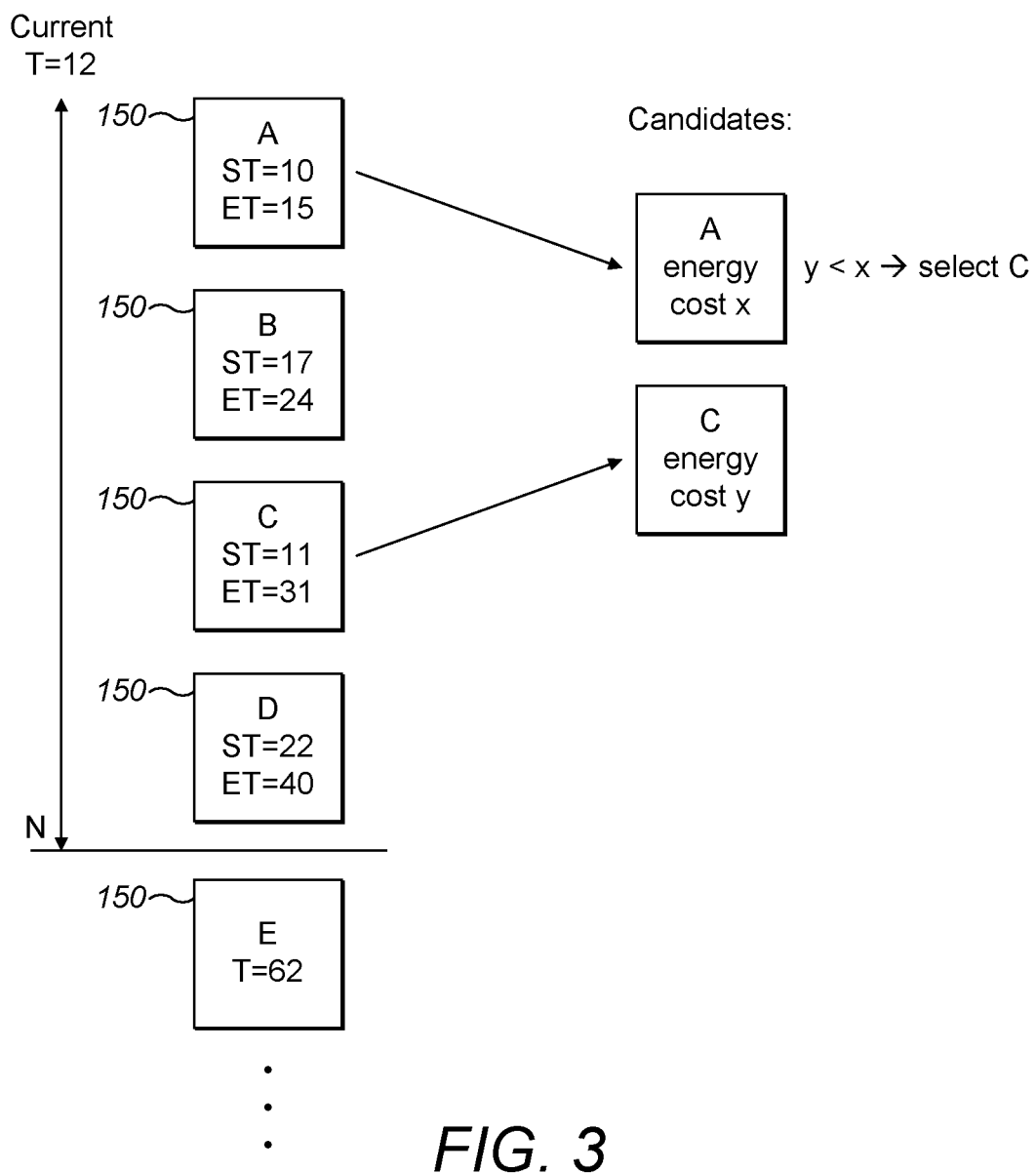
FIG. 3 shows an example of determining candidate schedules for execution by the processing apparatus and selecting a candidate schedule for execution.

FIG. 3 shows an example of determining the candidate schedules at step 50 of FIG. 2. Data representing a number of candidate schedules 150 is stored together with associated information for each candidate schedule. The associated information includes time window information specifying a time window within which the candidate schedule should be processed. In this example, the time window is represented by a start time (ST) and end time (ET) which represent the earliest and latest times respectively that the candidate schedule can be processed. In some cases the time window may define the time period within which execution of the schedule must at least have started, but it may be allowable for the candidate schedule to complete after the end of the time window. Other systems may require the candidate schedule to have finished execution within the time window. The associated information may also include an estimate of the expected total execution time for the candidate schedule. By setting a time window for execution of the schedule, rather than an absolute execution time, there is some flexibility for delaying or reordering execution of operations. More information about time based scheduling is available from the co-pending application GB 1317753.0, U.S. patent application Ser. No. 15/027,241 in the name of the present applicant, the contents of which are entirely incorporated herein by reference.

As shown in the left hand part of FIG. 3 the schedules available for execution may be ordered by the end time of the corresponding time windows. The scheduler may then consider the first N of the candidate schedules in the time sorted order. In this example, N=4 and so the four schedules which have the time windows expiring soonest are considered. The schedule then considers which of these schedules has a start time which is earlier than the time corresponding to the current execution point for which the scheduling is taken place. This current time may be the actual current time if the scheduling is taking place at execution time, or may be an expected time at which the scheduled candidate operations will be performed when the scheduling is taking place ahead of time. In this example schedules A and C are selected because these have start times 10, 11 which are before the current execution time 12. Schedules B and D are not selected because their time windows have not started yet.

Hence, the scheduler determines schedules A and C as the candidate schedules available for selection for executing at the current execution time. The scheduler then determines the expected energy cost functions for these candidates, either by looking up previously measured or cached energy functions for these candidates, or by determining new energy cost functions based on the associated information for the candidates. Having obtained energy cost functions, one of the candidates is selected which will give the lowest expected energy cost. For example, in this case, candidate C is selected. This approach provides a relatively efficient mechanism for scheduling which nevertheless provides good energy savings. By sorting the candidate schedules by the end time of the time window the most urgent schedules will be more likely to be selected first. Nevertheless by considering more than just the most urgent schedule and also considering some additional schedules it is possible to use energy considerations to select between them.

In some cases, an additional factor may be considered such as the overall lateness of scheduling. For example, if there is a candidate schedule for which the end time is already expired then it may be selected in preference to other schedules even if it required a higher energy cost. See GB 1317753.0 mentioned above for an explanation of how a lateness metric can be considered when scheduling.

The associated information for the schedules, including the time window information and the indication of resources required, may be provided by the programmer (for example using annotations for different blocks of code), or may be learnt or measured during execution of the operations.

Figure 4:
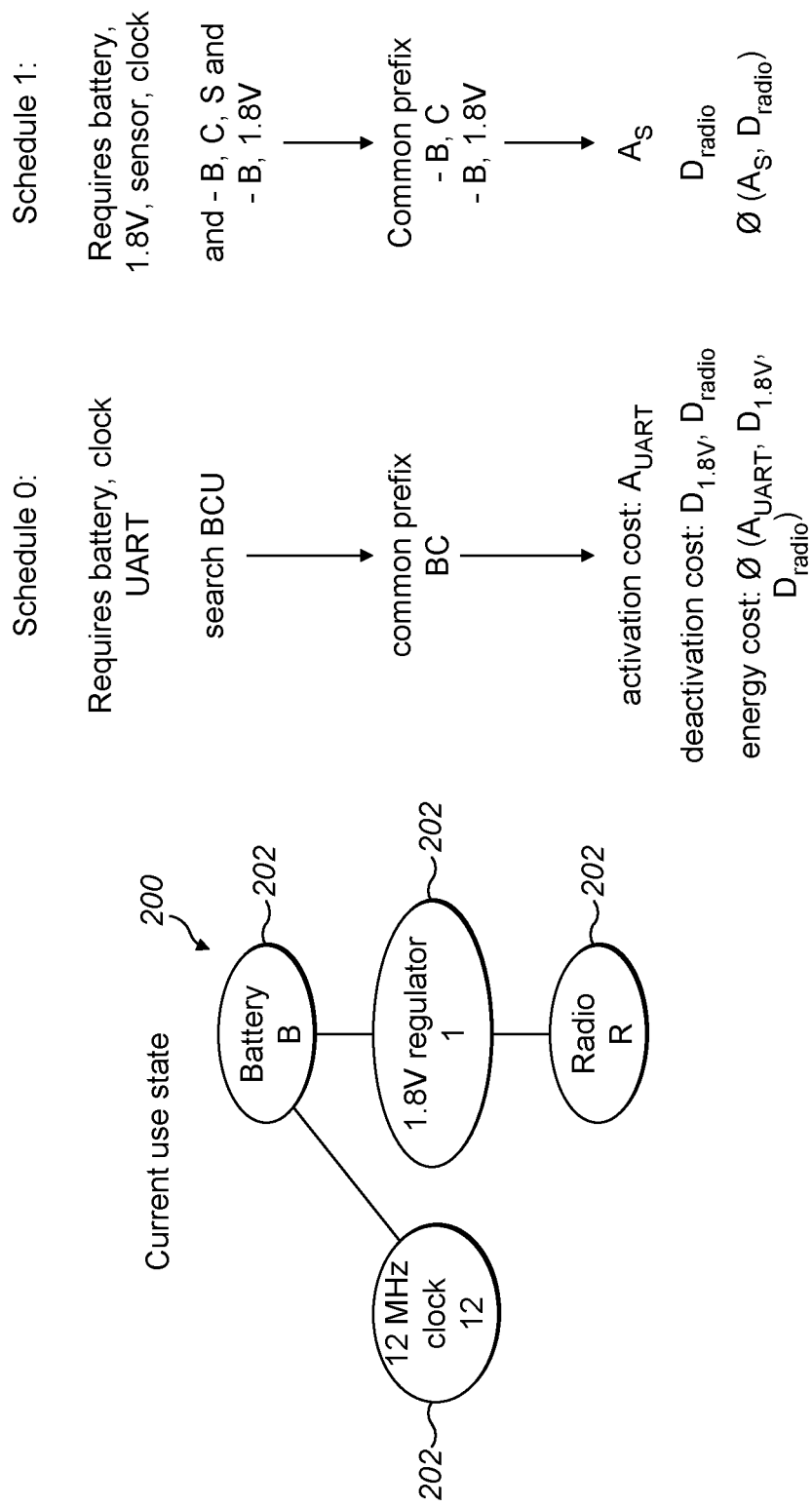
FIG. 4 shows an example of determining energy cost functions for candidate schedules.

FIG. 4 shows an example of determining the energy cost functions. It will be appreciated that there are many other ways of determining energy cost functions. As shown in the left part of FIG. 4, the current use state of resources may be represented using a prefix tree structure 200 which has nodes 202 representing the currently active resources. In some cases the nodes may represent not just whether the resources are active but also which states the resources are in. For example nodes corresponding to the resources may have child nodes corresponding to the current state of the resource. The dependencies between resources are reflected in the tree 200 through the branches between different nodes. For example, in FIG. 4 the radio unit 16 requires the 1.8V regulator 14 to be active in order to operate and the 1.8V regulator 14 requires the battery 10 to be active. Therefore, in the prefix tree 200 the node for the radio is a child node of the node for the 1.8 volt regulator and the node for the 1.8V regulator is a child node of the node for the battery. The prefix tree allows common resource dependencies to be stored only once. Each resource in the tree may be represented by a pointer, character, index, string or set of digits representing the corresponding resource. The prefix tree efficiently stores a set of lists (e.g. [battery, 1.8V, radio], [battery, 12 MHz clock] etc.) by combining the common prefixes as branches of the tree.

The prefix tree can then be searched using a string determined based on the resources required for the candidate schedule, to compare the required resources with the currently active resources. The prefix tree is an efficient structure for doing this. Hence, the right hand part of FIG. 4 shows two examples of searching the tree for candidate schedules 0 and 1. Schedule 0 requires the battery 10, the clock generator 8, and the UART 18. Hence, the tree is searched for string "BCU" representing this combination of the resources and searching the tree shown in the left hand part finds that there is a common prefix "BC" representing that the battery 10 and clock generator 8 are both currently active but the UART is not active. Hence, this identifies which resources are already active, which can be used to determine which resource costs to consider for the energy cost function. The string used for searching may be a list of characters (letters, numbers or symbols), a list of numbers, or a list of pointers, for example. In some cases, more than one list of resources may need to be searched for in the tree. The scheduler may then determine an activation cost A associated with activating any resources which are not already active but are required for schedule 0 (e.g. the UART 18) and a deactivation cost D of deactivating the already active resources which are not required for the schedule (e.g.

the 1.8V regulator 14 and radio unit 16 in this example). The scheduler may then determine an energy cost function as a function $\square(A_0, A_1, D_0 \ldots)$ of the activation and deactivation costs of the relevant resources. In general, the energy cost function may represent a higher energy cost the more resources need to be activated or deactivated. Any function dependent on the individual resource costs may be used. For example, the function could be a simple sum of the resource costs, or may be a more complex function.

The energy cost function for schedule 1 is determined in a similar way to schedule 0, considering which resources need to be activated or deactivated. In this example, two strings are searched for schedule 1, corresponding to different branches of the prefix tree: "Battery, Clock, Sensor" (B, C, S) and "Battery, 1.8V" (B, 1.8V). The energy cost functions $\square$ for each candidate schedule are then compared and the schedule having the lowest energy cost is then selected for execution.

To simplify cost calculations, the parent and child dependencies of the resources may be considered. For example, the cost of a particular resource may factor in the cost of activating child resources, or vice versa with the child's resource cost factoring in the cost of its parents. This can reduce the number of resource costs that need to be considered in the cost function. Although FIG. 4 shows an example where activation and deactivation costs are independently defined, it is possible to provide a single cost for each resource (e.g. only considering activation costs).

The resource costs may also depend on the extent to which the resource is currently being used or depend on a current use state of the resource. For example, the resource may have different modes and the cost may be different in different modes. Also, some resources such as a linear voltage regulator may be more efficient if being used by two components than just by one, so the cost can reflect that the scheduler should tend to avoid switching it on when there is only one user of the resource but be more eager about switching from one user to two or more users. Hence, the resource costs may be reference dependent (where the reference reflects how much the resource is being used). For example, a reference counter may be maintained for some resources reflecting the number of accesses to the resource and the resource use cost may be a function of the reference counter. In some cases the resource use cost may depend on environmental factors such as temperature or time of day (e.g. for a device having a solar cell, energy may be available during the day but not at night). Also, the environmental factors may include information specifying the position of the device 2 within a network or the context in which the device 2 is being used. For example, the device's position in a mesh network may determine the energy efficiency with which different resources can be used, especially for remote resources which are not local to the device 2.

While FIG. 4 shows an example where the resource use cost reflect activation or deactivation of the resources, it is also possible to provide resource costs based on an ongoing energy consumption. This may be more appropriate for some hardware units where the activation/deactivation cost is negligible. Therefore, different kinds of resources may have different types of resource costs.

In some cases the resource use cost may be based on a measurement of energy consumed when the resource was used in the past. In other cases the resource use cost may be an estimate or approximation of an expected energy cost. If the resource use cost is learned then the cost of the resource may be inferred from an overall power consumption of the apparatus using information defining which resources were used when. For example, activation and deactivation times of different resources may be recorded and this may be used to map a total energy consumption to individual energy consumptions associated with different resources. In some cases, the energy use may be inferred from current drawn in a data processing apparatus, or voltage droop in a battery. A switching frequency of a DC/DC voltage regulator may also be monitored. In some cases maximum loads on resources may be learned by looking at voltage droop. As well as learning usage of resources and the corresponding energy consumed, the system may also learn the annotations for the operations within candidate schedules, such as learning which resources are used by which operations. The energy cost function may be based on measuring energy/resource use for a particular set of operations to be performed and this may be recorded in the annotation information associated with the candidate schedule or groups of operations within a schedule. Some systems may have a separate monitoring unit, such as a trace unit or security unit, which can monitor the processor and learn the resources used by the processor when performing different tasks.

Resource costs can be cached for faster lookup at a later point, to avoid repeatedly measuring the energy consumed when using the resource. Similarly, energy cost functions for previously determined candidate schedules may be cached, or an entire pattern of selection of candidate schedules may be cached which were determined at a previous scheduling. Hence, if the processing encounters the same conditions again then a cached schedule, cost function or resource cost can be used again.

The scheduler may apply a cost limit which prevents any candidate schedule having an expected energy cost higher than a certain level being selected. For example, the limit may be implemented in terms of maximum energy or power consumed, or a maximum current that can be drawn, or may be a soft limit which does not correspond to a real physical limit within the device, but which is applied by the system designer to prevent energy costs sky rocketing.

The energy cost functions generated when scheduling may also be used to provide diagnostic information for example providing messages indicating how energy efficient the processing has been. This can help users, developers and programmers understand how their code affects the energy efficiency of the device. For example, an energy efficiency score or graph may be output to provide feedback which can help code become more efficient. Also, the diagnostic information may be used to restrict access to the device so that only code which has previously been established as being more energy efficient than a certain threshold is allowed to run in future. This allows ejection of resource users to optimize energy efficiency.

Although illustrative embodiments have been described in detail herein with reference to the accompanying drawings, it is to be understood that various changes and modifications can be effected therein by one skilled in the art without departing from the scope of the appended claims.

The invention claimed is:

1. A method for scheduling operations to be executed by processing circuitry at a data processing apparatus, the method comprising:

determining, with a scheduler at the data processing device, an energy cost function for a plurality of candidate schedules, each candidate schedule comprising a different selection or ordering of at least one operation available for execution by the processing circuitry;

selecting, with the scheduler one of the plurality of candidate schedules for execution by the processing circuitry based on the energy cost functions of the plurality of candidate schedules; and executing, with the processing circuitry at the data processing apparatus, the at least one operation of the selected candidate schedule;

wherein each candidate schedule has associated information identifying at least one resource of the data processing apparatus required for execution of the at least one operation for the candidate schedule; and wherein the energy cost function represents an energy cost of selecting the candidate schedule and is determined based on the associated information for the candidate schedule.

2. The method of claim 1, wherein the selecting step selects one of: a candidate schedule for which the energy cost function represents an energy cost less than an energy cost limit and one of the plurality of candidate schedules for the data processing apparatus that has an energy cost function representing the lowest energy cost.

3. The method of claim 1, wherein the energy cost function is determined based on the associated information and a current use state of resources of the data processing apparatus following execution of previous operations.

4. The method of claim 3, wherein the energy cost function is dependent on a degree of similarity between the current use state of the resources and the resources identified by the associated information for the candidate schedule.

5. The method of claim 3, wherein the current use state of the resources is represented by a prefix tree, and the energy cost function for a candidate schedule is dependent on a result of searching the prefix tree for a value representing the at least one resource identified by the associated information for the candidate schedule.

6. The method of claim 1, wherein the energy cost function represents one of: a total amount of energy consumed and power consumed if the candidate schedule is selected for execution by the processing circuitry or wherein the energy cost function for a candidate schedule is dependent on a resource use cost associated with at least one resource required for the at least one operation for the candidate schedule.

7. The method of claim 6, wherein the resource use cost represents one of: an energy cost of continued use of the resource and at least one of an activation cost of activating the resource.

8. The method of claim 6, wherein for at least some resources, the resource use cost is variable depending on the current use state of the corresponding resource.

9. The method of claim 6, comprising determining the resource use cost for a resource based on a measurement or estimation of energy consumed when the resource is used, wherein the resource use cost is inferred from measurements of the total energy consumed by the data processing apparatus over a period of time and information representing the resources used during the period of time.

10. The method of claim 1, wherein the energy cost function is dependent on environmental conditions detected by or known to the data processing apparatus.

11. The method of claim 1, wherein the energy cost function is dependent on a probability that subsequent operations will require a similar use state of resources to the at least one operation of the candidate schedule.

12. The method of claim 1, wherein the energy cost function represents an approximate estimate of the energy cost or wherein the energy cost function for a candidate schedule is based on a measured energy cost measured when the at least one operation for the candidate schedule was previously executed by the processing circuitry or is dependent on a deactivation cost of deactivating at least one active resource which is not required for execution of the at least one operation of the candidate schedule.

13. The method of claim 1, comprising at least one of:
(i) activating or initializing at least one resource required for execution of the at least one operation for the selected candidate schedule; and
(ii) deactivating or deinitializing at least one resource not required for execution of the at least one operation for the selected candidate schedule.

14. The method of claim 1, comprising caching energy cost functions determined for candidate schedules; and
omitting the determination of the energy cost function for a candidate schedule if the energy cost function for the candidate schedule has already been cached.

15. The method of claim 1, comprising caching information indicating candidate schedules selected previously for execution by the processing circuitry together with identifying information representing a condition of the data processing apparatus when the candidate schedule was selected; and
if the condition when the candidate schedule was selected occurs again, selecting the candidate schedule indicated by the cached information for execution by the processing circuitry.

16. The method of claim 1, wherein each candidate schedule corresponds to at least one block of program instructions and comprises the operations executed by the data processing apparatus in response the at least one block of program instructions.

17. The method of claim 1, wherein for at least some candidate schedules, the associated information is based on information specified by a programmer or determined based on which resources were required for the at least one operation of the candidate schedule at a previous instance of execution.

18. The method of claim 1, wherein the associated information identifies a time window within which the at least one operation should be executed by the processing circuitry, and the plurality of candidate schedules are determined based on the time information, wherein the plurality of candidate schedules available for selection for execution by the processing circuitry at a current execution time are determined by:
(i) determining N candidate schedules available for execution by the data processing apparatus for which the time window specified by the associated information will expire earliest, where N≥2; and
(ii) determining as the candidate schedules M of said N candidate schedules for which the current execution time is after the start of the time window specified by the associated information, where M≤N.

19. A computer readable storage medium storing a computer program which, when executed by processing circuitry at a data processing apparatus, controls the data processing apparatus to:
determine an energy cost function for a plurality of candidate schedules, each candidate schedule comprising a different selection or ordering of at least one operation available for execution by the processing circuitry;

select one of the plurality of candidate schedules for execution by the processing circuitry based on the energy cost functions of the plurality of candidate schedules; and wherein each candidate schedule has associated information identifying at least one resource of the data processing apparatus required for execution of the at least one operation for the candidate schedule; and wherein the energy cost function represents an energy cost of selecting the candidate schedule and is determined based on the associated information for the candidate schedule.

20. A data processing apparatus comprising:

processing circuitry configured to execute operations; and a scheduler configured to schedule operations to be executed by the processing circuitry;

wherein the scheduler is configured to determine an energy cost function for a plurality of candidate schedules, each candidate schedule comprising a different selection or ordering of at least one operation available for execution by the processing circuitry, and select one of the plurality of candidate schedules for execution by the processing circuitry based on the energy cost functions of the plurality of candidate schedules;

wherein each candidate schedule has associated information identifying at least one resource of the data processing apparatus required for execution of the candidate schedule; and wherein the energy cost function represents an energy cost of selecting the candidate schedule and is determined based on the associated information for the candidate schedule.

* * * * *